Jan. 24, 1928.
D'ORSAY McC. WHITE
1,657,329
DRIVING WHEEL
Filed Sept. 21, 1925
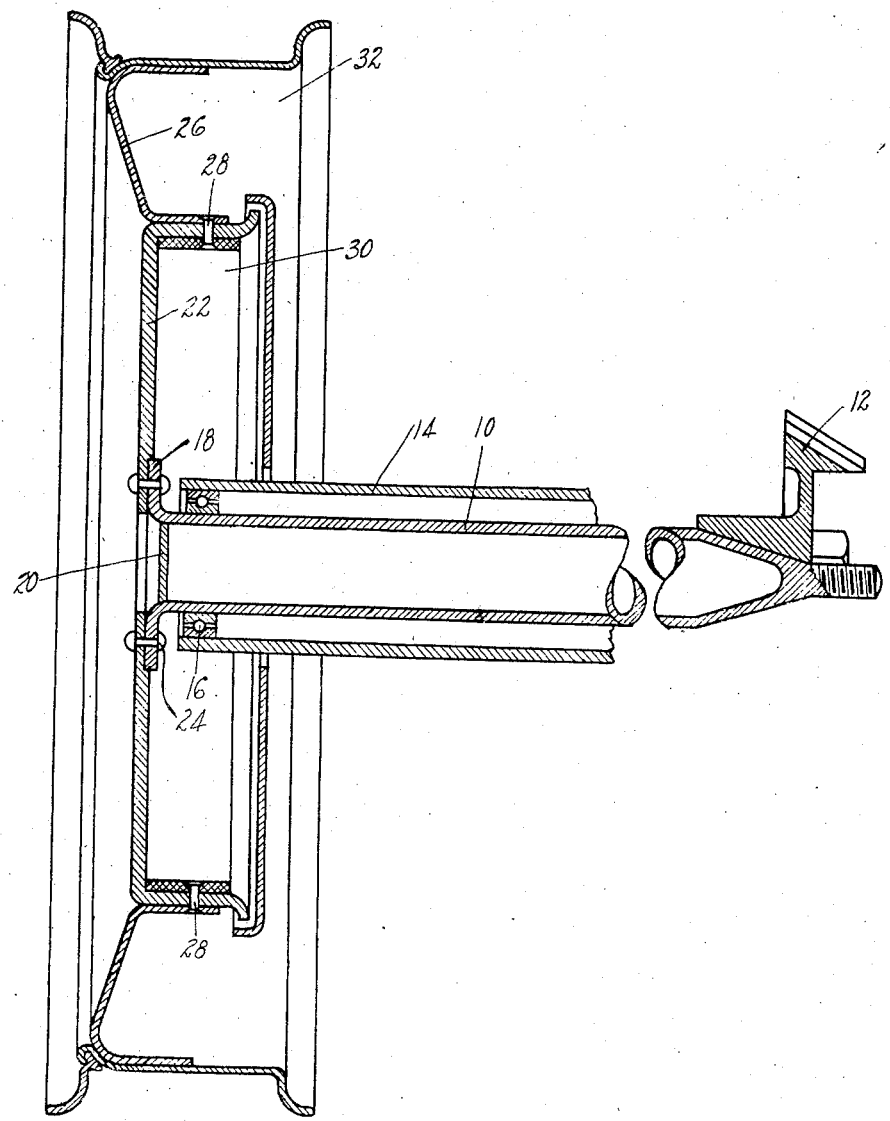
INVENTOR
D'ORSAY McCALL WHITE
BY
ATTORNEY Patented Jan. 24, 1928.

1,657,329

UNITED STATES PATENT OFFICE.

D'ORSAY McCALL WHITE, OF CHICAGO, ILLINOIS, ASSIGNOR TO MOTOR INDUSTRIES, INC., OF CHICAGO, ILLINOIS, A CORPORATION OF ILLINOIS.

DRIVING WHEEL.

Application filed September 21, 1925. Serial No. 57,597.

This invention relates to wheels, and is illustrated as embodied in a rear disk wheel for an automobile driven by a three-quarter floating axle.

An object of the invention is to arrange the parts so that the brake drum and the rim are both bisected by the axle bearing which carries the load, especially in a construction in which the brake drum forms the major part of the wheel. Another feature relates to forming the wheel or drum with a shoulder to be seated and piloted on the driving flange of the drive axle.

These and other features of the invention will be apparent from the following description of one illustrative embodiment shown in the accompanying drawing, in which:

The figure is a horizontal section through one rear wheel and associated parts.

The wheel shown is driven by a live axle 10, shown as a tube swaged down at one end to receive one side gear 12 of the differential, and supported near its end in the axle housing 14 by an anti-friction bearing 16.

The outer end of the tube is expanded to form a driving flange 18, the tube being closed if desired by a Welch plug 20. On this flange is piloted a shoulder formed by rabbeting out a brake drum 22, the drum being demountably secured by bolts 24.

On the brake drum is mounted an annular rim-carrying part or ring 26, shown channel-shaped in cross-section and with its inner flange secured to the braking flange of the drum by rivets 28 which also serve to hold a suitable metal liner 30. Ring 26 is flared outwardly, with its outer flange terminating at the plane of bearing 16, so that this plane substantially bisects rim 32 demountably or permanently fastened on the ring.

While one illustrative embodiment has been described in detail, it is not my intention to limit the scope of the invention to that particular embodiment, or otherwise than by the terms of the appended claims.

I claim:

1. A vehicle having, in combination, a live axle having an out-turned flange at its outer end, and a disk wheel having a shoulder to seat on and be centered by the outer edge of said flange and secured to said flange.

2. A vehicle having, in combination, a tubular live axle expanded at its end to form a driving flange, and a disk wheel piloted on and secured to said flange.

In testimony whereof I have hereunto signed my name.

D'ORSAY McCALL WHITE.